United States Patent
Karnas

(10) Patent No.: US 6,213,682 B1
(45) Date of Patent: Apr. 10, 2001

(54) OFFSHORE REEF

(76) Inventor: Joe Karnas, 33687 Lake Rd., Apt. 109, Avon Lake, OH (US) 44012

( * ) Notice: Subject to any disclaimer, the term of this patent is extended or adjusted under 35 U.S.C. 154(b) by 0 days.

(21) Appl. No.: 09/448,878

(22) Filed: Nov. 24, 1999

(51) Int. Cl.$^7$ ..................................................... E02B 3/06
(52) U.S. Cl. .................. 405/30; 405/35; 405/21
(58) Field of Search ................... 405/35, 34, 33, 405/30, 15, 21, 23, 25, 27; 119/221, 222

(56) References Cited

U.S. PATENT DOCUMENTS

| | | | |
|---|---|---|---|
| 3,845,630 | * 11/1974 | Karnas | 405/30 |
| 3,908,384 | * 9/1975 | Frey | 405/30 |
| 3,928,701 | * 12/1975 | Roehner | 114/219 |
| 4,341,489 | 7/1982 | Karnas . | |
| 5,011,327 | * 4/1991 | Thiac | 405/28 |
| 5,238,325 | * 8/1993 | Krenzler | 405/21 |

* cited by examiner

*Primary Examiner*—David Bagnell
*Assistant Examiner*—Frederick L. Lagman
(74) *Attorney, Agent, or Firm*—Renner, Otto, Boisselle & Sklar, LLP

(57) ABSTRACT

An offshore reef assembly includes semi-cylindrical reef members extending generally perpendicular to the shore line and arranged in upper and lower tiers so that the open side of the upper tier faces downwardly and the open side of the lower tier faces upwardly. The semi-cylindrical members in the upper tier are offset from those of the lower tier to divide and deflect vertically moving water laterally through an ogee curvature from one reef member to a laterally offset and inverted reef member, thus dividing and dissipating the kinetic energy of the water to cause the deposition of sand and particulates on the bottom around the reef assembly. The reef assembly is inexpensive both to construct and install.

17 Claims, 4 Drawing Sheets

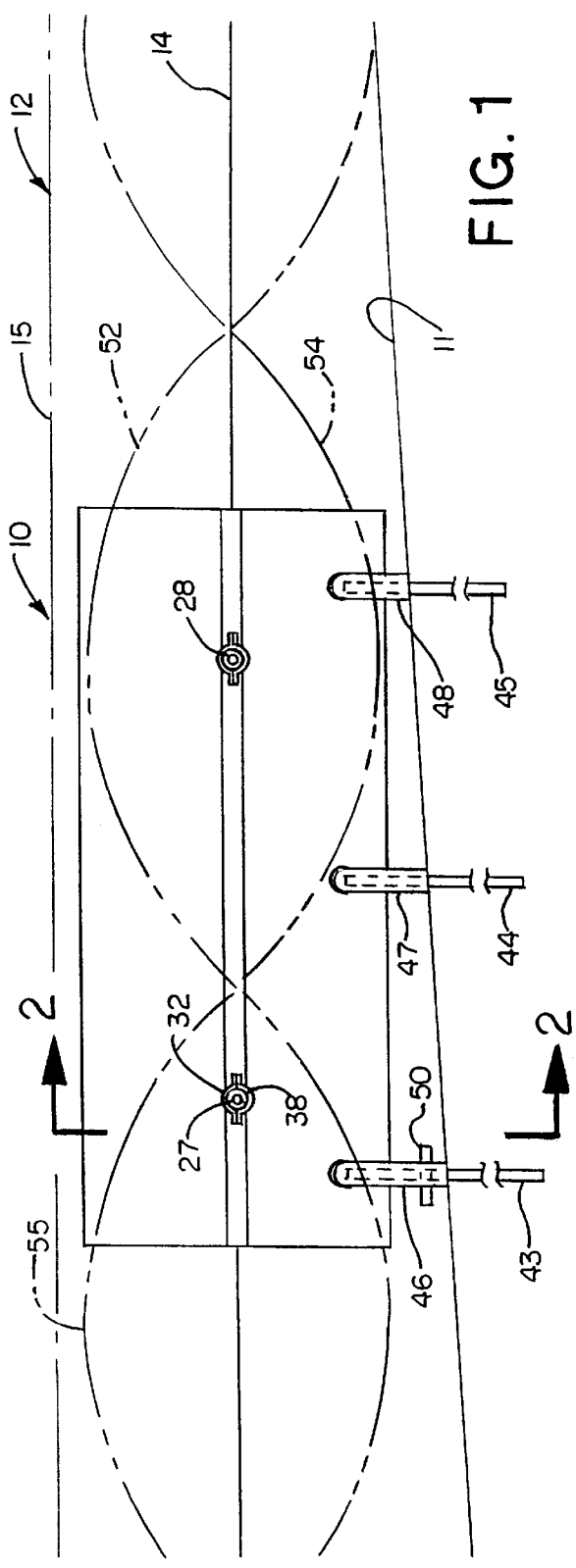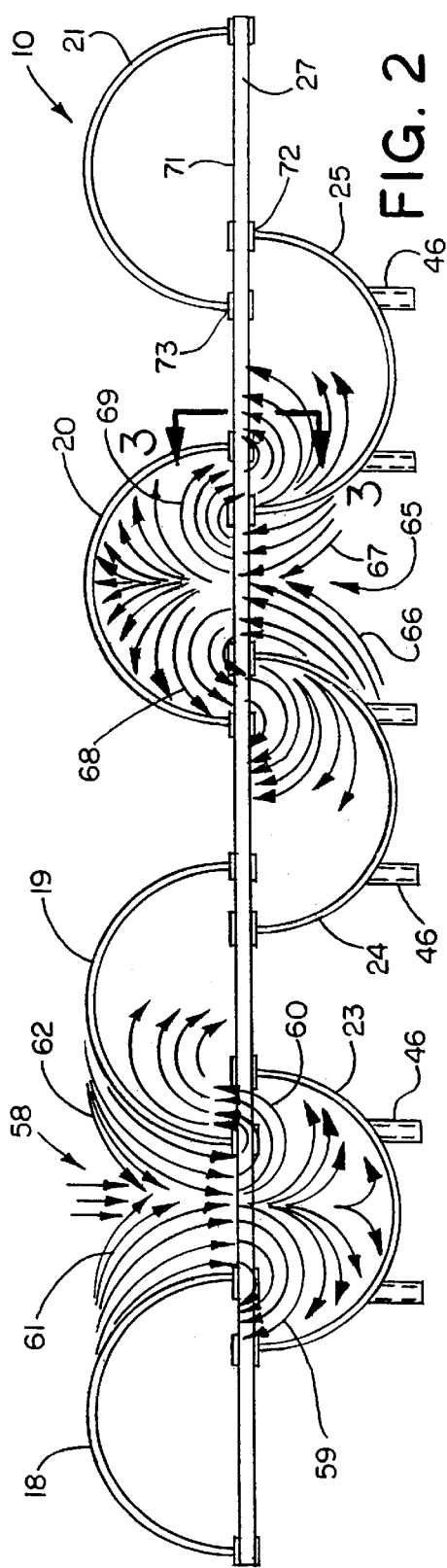

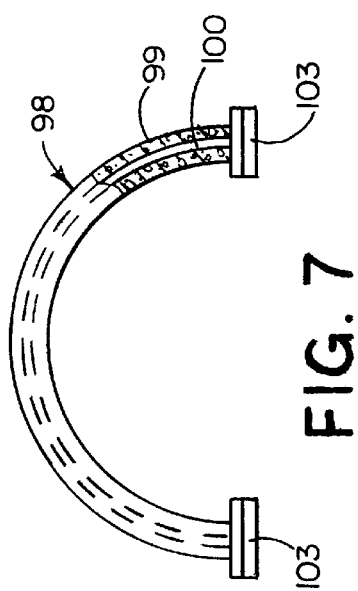
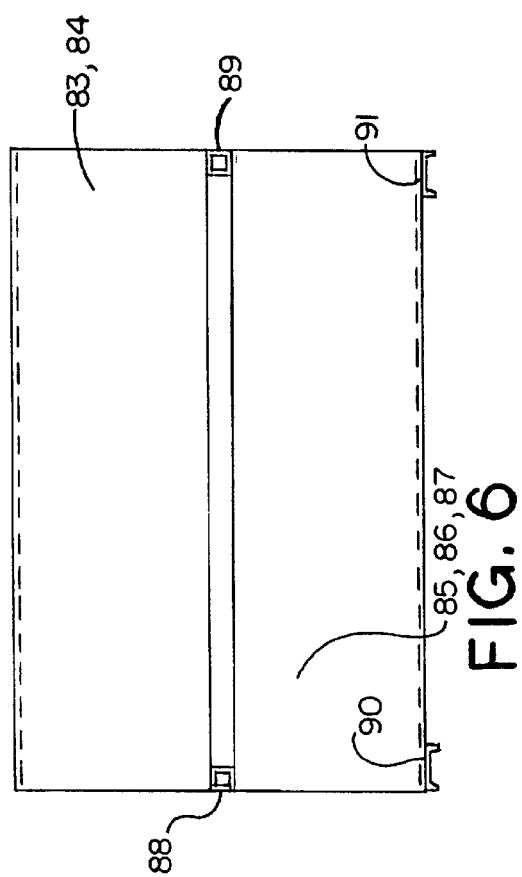
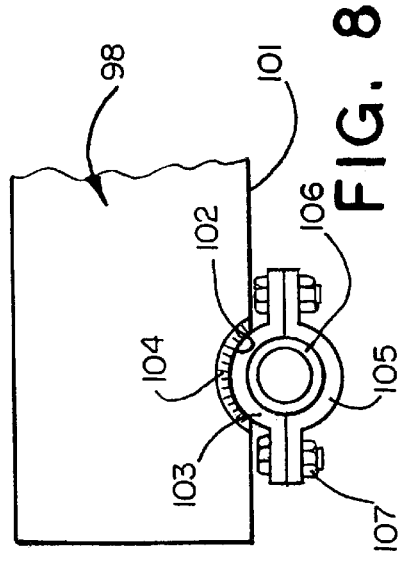

OFFSHORE REEF

This invention relates generally as indicated to an offshore reef, and more particularly to a method and apparatus for dissipating the kinetic energy of waves to cause the deposition of sand and other particulates carried by the water on the bottom around the reef.

BACKGROUND OF THE INVENTION

Shore erosion is a continuing problem along many shorelines including those of the oceans as well as the Great Lakes. During storms or rough water, beaches can literally disappear. Many efforts have been made to prevent this erosion ranging from breakwaters to offshore reefs. One particularly effective offshore reef assembly is shown in my prior U.S. Pat. No. 4,341,489.

The offshore reef assembly of this patent uses a series of substantially vertical supports. Blocks in the form of frustums of pyramids or cones are stacked on the vertical supports in an offset fashion to form with the inclined side faces of the blocks laterally spaced yet facing alternating ribs and grooves. The staggered faces on the blocks on the vertical supports dissipate the vertical wave action causing sand and other particulates in the water to drop out and be deposited on the bottom around the reef assembly.

One major problem with such offshore reef assembly is the complexity of the structure having a substantial number of parts, but also the difficulty of assembly offshore. A difficulty is that the parts may not be substantially preassembled on shore. The reef assembly literally has to be assembled offshore requiring an inordinate amount of expensive barge and crane time.

SUMMARY OF THE INVENTION

With the present invention, an offshore reef may be preassembled on shore in large sections and then quickly transported to the desired site for quick installation.

The offshore reef assembly includes large semi-cylindrical reef members extending generally perpendicular to the shoreline and submerged or partly submerged. The semi-cylindrical reef members are arranged in at least two tiers with those on top opening downwardly and those on the bottom opening upwardly. The reef members on the top tier are laterally spaced from each other as are the reef members on the bottom tier. The lateral spacing provides an ogee or reverse curved lateral dissipating path for the vertical action of the waves. The configuration diverts the vertical wave action to lateral action. The water moving through the semi-cylindrical reef members attenuates the water flow which in turn nullifies the transport velocity of the water to a point where it can no longer support material having a higher specific gravity, such as sand. The sand then drops out and builds up around the offshore reef assembly. The shore or beach is thus restored.

Several forms of offshore reef assemblies are disclosed. In each form the semi-cylindrical reef members are of generally the same size or diameter. The two oppositely vertically opening tiers are secured to transverse mid-frame members such as tubes or pipes which provides a large unitized section to facilitate fabrication and offshore transportation and placement. C-clamps may be welded to the edges of the reef members to facilitate attachment to the transverse mid-frame members. The generally scalloped arrangement provided by the oppositely opening tiers provides the lateral ogee path curvature to reduce the transport velocity. Preferably the opening of a semi-cylindrical reef member will overlap the two opposite laterally spaced reef members to an extent of half the radius. Thus, for a six foot diameter section the overlap would be 1.5 feet.

For an eight foot diameter section the overlap would be two feet.

The reef member sections may be fabricated from rolled steel. One convenient source is longitudinally cut tank or tank car sections. The reef member may also be formed from longitudinally cut large reinforced concrete pipe, in which case the internal mesh or reinforcement may be welded, for example, to such C-shape pipe clamps and thus clamped to unitizing pipe or tube frame members. A bottom frame may also be used. The bottom frame may include holes fitting over piles, or the bottom tier reef members may have sleeves which slide over piles driven into the bottom. The few simple and inexpensive parts easily fabricated on shore into a unitized frame make the offshore reef low cost both for fabrication, assembly and offshore placement.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

FIG. 1 is a side elevation of one form of offshore reef assembly in accordance with my invention;

FIG. 2 is a transverse vertical section taken substantially on the line 2—2 of FIG. 1;

FIG. 6 is an end elevation of the reef section of FIGS. 4 and 5;

FIG. 7 is a partially broken and in section end elevation of a steel reinforced concrete reef member with the pipe clamps attached; and FIG. 8 is a fragmentary side elevation showing how the pipe clamp is welded to the mesh or steel reinforcing of the concrete section.

DETAILED DESCRIPTION OF THE PREFERRED EMBODIMENTS

Figure 3:
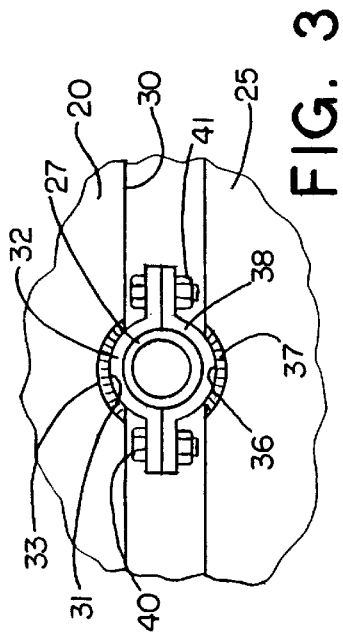
FIG. 3 is an enlarged fragmentary section through the center frame pipe section as taken from the line 3—3 of FIG. 2.

Referring initially to the embodiment of FIGS. 1–3, it will be seen that there is illustrated a reef assembly shown generally at 10 which is mounted on the bottom 11 of a body of water 12 offshore. The shore is at the right hand side of FIG. 1 running generally perpendicular to the plane of the Figure. The bottom 11 slopes away from the shore. The mean water level of the body of water with respect to the offshore reef assembly 10 may range from the position seen at 14 to the position seen at 15 or even higher. In the position seen at 14, approximately the upper half of the reef assembly is exposed. If the mean water level is at 15, the reef assembly is submerged.

As seen more clearly in FIG. 2, the reef assembly 10 comprises upper semi-cylindrical reef members 18, 19, 20 and 21 which open downwardly. The reef assembly also comprises lower semi-circular reef members 23, 24 and 25 which open upwardly. Accordingly, the reef members are arranged in an upper tier opening downwardly and a lower tier opening upwardly. The reef members in the upper and lower tiers are held together as a unit to form the reef assembly by transverse tubular frame members seen at 27 and 28. The connection is seen more clearly in FIG. 3. The edge 30 of the reef member 20 is provided with a circular notch seen at 31 which is welded to the semi-circular exterior portion of a C-clamp 32 as indicated at 33. The edge of the reef member 25 is similarly provided with the notch 36 welded at 37 to C-clamp 38. The C-clamps are then simply bolted together through the abutting flanges as indicated by the nut and bolt assemblies 40 and 41.

The reef assembly 10 is mounted on the bottom 11 on projecting piles seen at 43, 44 and 45 in FIG. 1. These piles may be driven into the bottom and project to the desired extent above the bottom. Each lower reef member is provided with pairs of vertically downwardly extending sleeves seen at 46, 47 and 48 welded to the underside of the respective reef members and symmetrically paired as indicated more clearly in FIG. 2. To place the reef assembly 10 in the desired location it is simply lowered over the projecting piles 43–45 to be positioned as indicated more clearly in FIG. 1. The reef assembly may be locked in place by suitable pins indicated at 50 so the wave action will not lift the reef assembly off the piles. The piles may be driven to the desired depth and may be provided with expansible anchors which resist vertical lifting of the pile.

When the reef assembly is in place it will be seen that the wave action indicated by the two curves 52 and 54 seen in FIG. 1 results in a rise and fall of the water. The nodes of the waves indicated at 55 will normally be moving toward the right or toward the shore.

An array of arrows on the left hand side of FIG. 2 illustrates the flow of the water on a downward movement. The downward force of the wind plus the acceleration of gravity on the water indicated by the arrows 58 develops the shape of the trough where the water then diverges laterally as directed by the bottom reef member 23 to flow in the form of an ogee or sine curve then upwardly into the adjacent reef members 18 and 19. This lateral diversion and splitting of the vertically moving water nullifies the transport velocity of the water and accordingly the water can no longer support any material which has a higher specific gravity than the water, such as sand. The laterally diverging flow through the ogee curve into the spaced and adjoining reef members 18 and 19 is shown by the array of arrows 59 and 60, respectively. It is noted that as the water goes down as seen at the left hand side of FIG. 2, the water is channeled between the outer surfaces of the reef members 18 and 19 to converge into the space between the reef members as seen by the array of arrows 61 and 62.

The array of arrows on the right hand side of FIG. 2 illustrates the cresting wave or the water moving upwardly. The cresting wave is of course a direct reaction to the wave trough as an equal and opposite reacting force. As the water moves upwardly at 65 it is confined between the spaced under surfaces of the reef members 24 and 25 and directed to the space between them as indicated by the array of arrows 66 and 67. When within the downwardly opening reef member 20 the upwardly moving water is split and diverted laterally into the ogee curvature shown by the array of arrows 68 and 69, respectively to be diverted into the interior of the reef members 24 and 25. This lateral division and diversion of the water flow nullifies the transport velocity of the water causing sand or other particulates with a higher specific gravity to drop out and be deposited on the bottom around the reef assembly.

In the embodiment of FIGS. 1, 2, and 3 the reef members are preferably formed of rolled steel and may be anywhere from 6–8 feet or more in diameter. A typical inexpensive source for such rolled steel is used or scrap tank cars which are simply longitudinally cut. The length of the rolled steel semi-cylindrical sections may be anywhere from 40 to 60 feet. The rolled sections may quickly and easily be fabricated with a cutting torch or welding equipment.

With reference to FIG. 2 it will be seen that the lateral spacing of the reef members in both the upper and lower tier is important so that the rising or falling water may be funneled through such spacing. It is also important that the upper tier and lower tier oppositely opening reef members be offset as indicated to provide the passages for the ogee or sine curve water flow laterally from one tier to the offset adjacent tier. Preferably the spacing between the laterally spaced semi-cylindrical reef members is equal to the radius of each reef member. The offset or overlap between the downwardly opening upper tier semi-cylindrical reef member and the offset upwardly opening lower tier semi-cylindrical member at the edge is approximately one half of the radius. Thus the cross sectional area of the port of the water flowing upwardly into the center of the top tier reef member is approximately equal to the two lateral ports of the water flowing from the edges of the down turned upper tier semi-cylindrical reef member into the up turned reef members at each side. Accordingly, if the diameter of the semi-cylindrical reef members is 6 feet, the radius is 3 feet. For example, at the right hand side of FIG. 2, the center or axis of the reef member 21 is shown at 71. The edge of the reef member 25 indicated at 72 is spaced from the axis half the radius. And the edge 73 is or course spaced the full radius. Thus at a 3 foot radius, the spacing to the first edge 72 would be 1.5 feet and to the outer edge 73 would be 3 feet. Typically with an 8 foot diameter, the radius is 4 feet and the spacing between the points 71, 72 and 73 would be 2 feet each.

Figure 4:
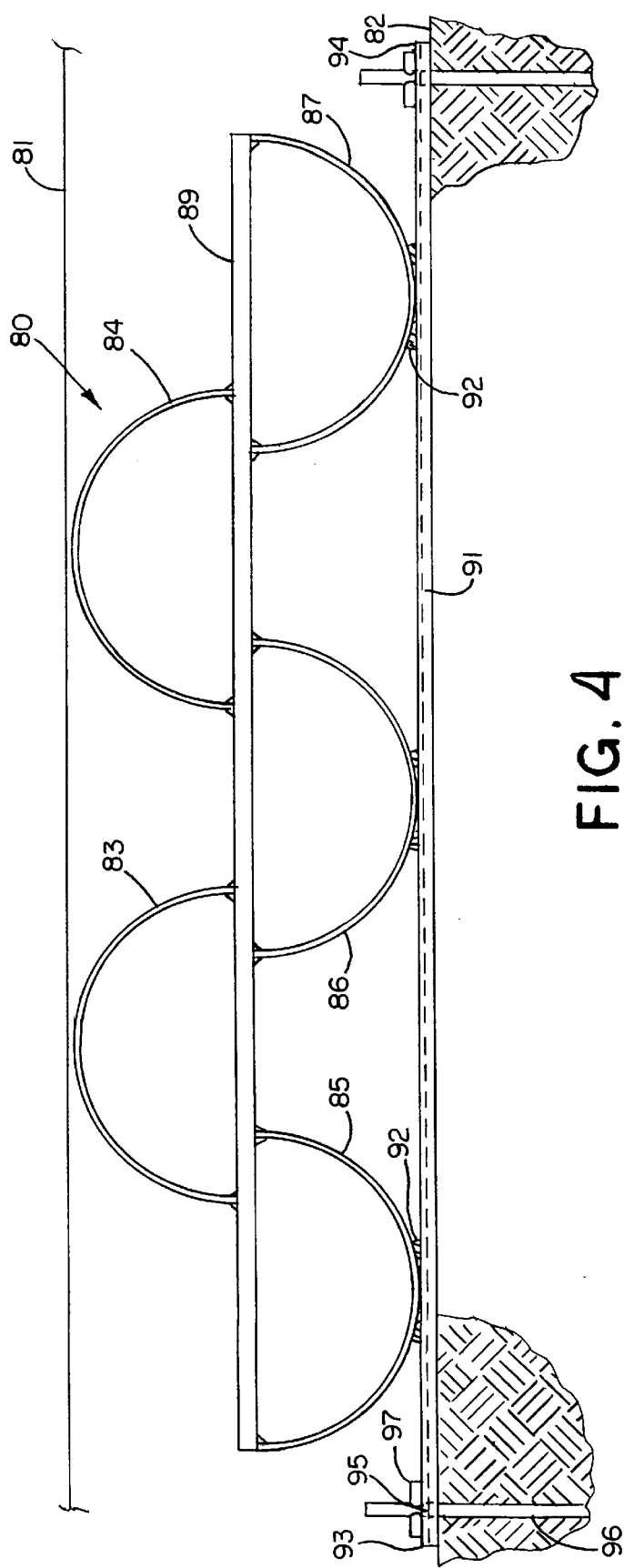
FIG. 4 is a transverse section through another form of reef section assembly having a bottom frame fitted over piles.
Figure 5:
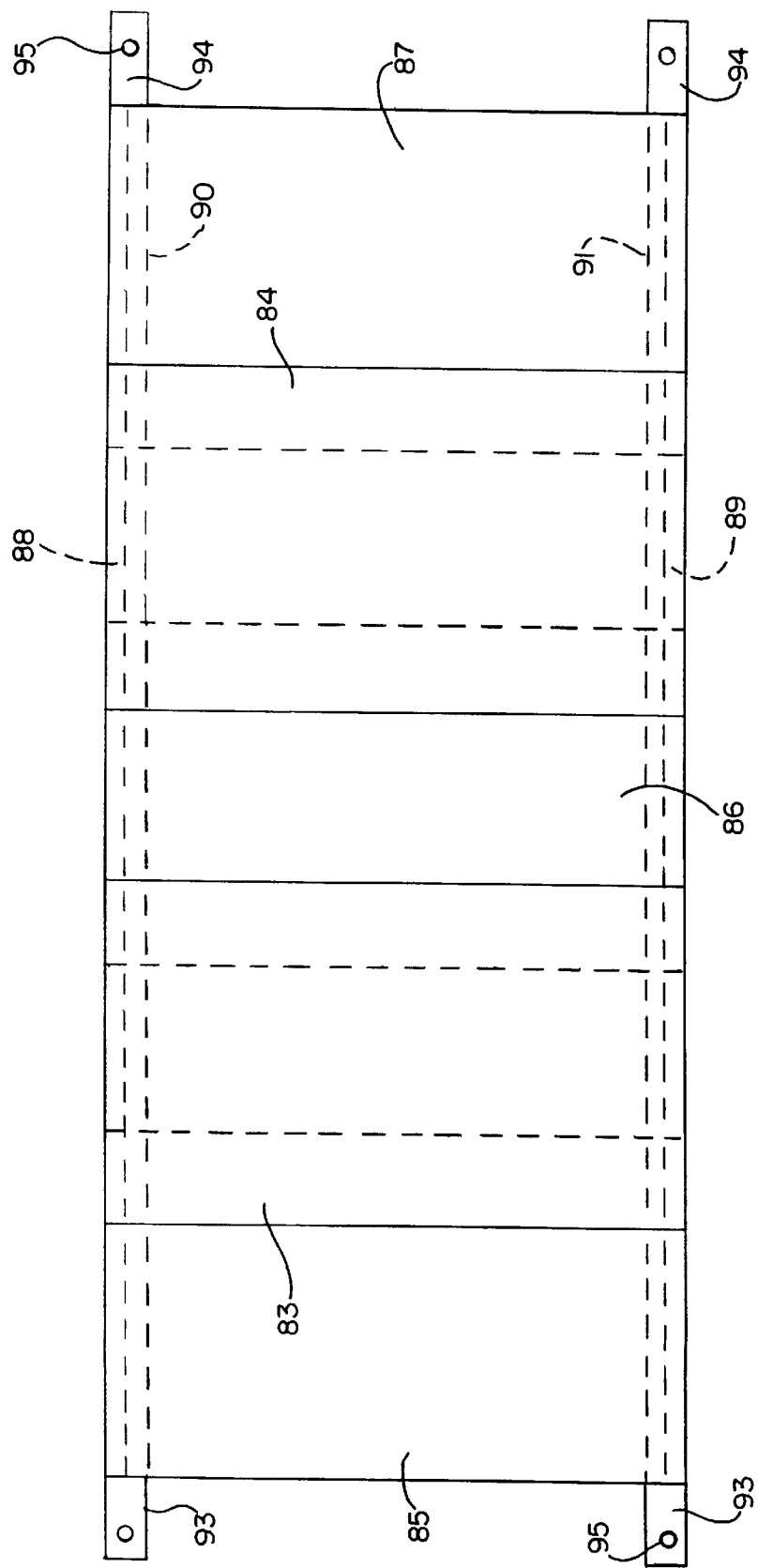
FIG. 5 is a top plan view of the reef section of FIG. 4.

Referring now to FIGS. 4, 5 and 6 there is illustrated another embodiment of the present invention where the reef assembly is shown generally at 80 positioned in the water below the mean water level 81 and resting on the bottom 82. The reef assembly 80 includes a tier of two laterally spaced upper semi-cylindrical reef members 83 and 84 which open downwardly. The upper tier reef members are spaced laterally from each other a distance approximately equal to a radius of the semi-cylindrical reef members. The reef assembly includes a tier of upwardly opening semi-cylindrical reef members 85, 86 and 87 also laterally spaced by the same dimension. The reef members are held together or unitized by transverse center frame members seen at 88 and 89 which may be in the form of square tubes welded to the edges of the reef members as seen in FIG. 6. It will be appreciated that other structural forms may be used as the center edge frame members.

In addition, secured to the bottom of each lower tier semi-cylindrical reef member is a channel frame member seen at 90 and 91. The channel members are at each edge of the reef assembly generally parallel and below the center frame members 88 and 89. The channel members may welded to the under side of the lower tier semi-cylindrical reef members as indicated at 92. The flanges of the channel members face downwardly and the length of the channel members is such that the channel members extend beyond the lateral sides of the reef assembly 80 as seen in FIG. 4 at 93 and 94. The projecting ends of the channel members are provided with holes 95 which may be positioned over piles 96 and locked in place by a suitable pin or locking member 97. Again the piles may be anchored.

With embodiment of FIGS. 4, 5 and 6 the reef assembly can quickly be fabricated and a number of such reef assemblies may be loaded on a barge, and with the assistance of a crane the reef assemblies may quickly be positioned and secured over the piles in the desired location.

While the embodiments of FIG. 1–6 utilize rolled steel sections to form the reef members, it will be appreciated that the reef members may also be formed of steel reinforced concrete such as seen by the reef member 98 in FIG. 7. The reef member 98 may for example be a large diameter steel reinforced concrete pipe which has been longitudinally cut to the semi-cylindrical configuration shown. Typically, the concrete pipe includes the concrete 99 and a center reinforcement such as reinforcing rods or a mesh 100. As seen in FIG. 8, the cut edge 101 may be provided with a generally circular recess 102 which exposes the steel reinforcing or mesh. The C-clamp 103 is then welded to the mesh or steel reinforcing as indicated at 104. Following the welding the connection may be sealed or grouted. The C-clamp is then used in connection with another C-clamp 105 to secure the reef member to tubular or pipe frame member 106 by the nut and bolt fasteners 107. The opposite C-clamp 105 may be secured to a similar steel reinforced concrete semi-circular reef member to form the tiers as illustrated in the embodiments of FIGS. 1–6. It will be appreciated that the reef assembly may be constructed completely of rolled steel plates, steel reinforced concrete semi-cylindrical sections, or both. The important thing is to provide the generally semi-cylindrical reef members with enough strength to attenuate the water velocity to permit the entrapped or entrained sand or other particulates to drop out thus avoiding shore erosion and accreting sand or particulates where beach erosion has occurred or where desired.

It can now be seen that there is provided an offshore reef assembly which comprises at least two tiers of semi-cylindrical reef members with the top tier opening downwardly and the bottom tier opening upwardly, and the reef members being laterally spaced and offset to form an ogee path to divide and dissipate the velocity of the water.

There is also provided a method of fabricating an offshore reef assembly which comprises the steps of forming at least two tiers of semi-cylindrical reef members with the top tier opening downwardly and the bottom opening upwardly to form a lateral sine curve dividing and dissipating path for vertically moving water.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only be the scope of the claims.

What is claimed is:

1. An offshore reef assembly comprising at least two tiers of semi-cylindrical reef members, the top tier opening downwardly and the bottom tier opening upwardly, the reef members being laterally spaced and offset to form an ogee path to dissipate the velocity of the water.

2. A reef assembly as set forth in claim 1 including a transverse center frame joining said reef members in said spaced and offset position to form a reef section for assembly and installation.

3. A reef assembly as set forth in claim 2 including C-clamps welded to the edges of said reef members for clamping to a transverse pipe or tube.

4. A reef assembly as set forth in claim 3 wherein each reef member is a rolled steel section.

5. A reef assembly as set forth in claim 3 wherein each reef member is a steel reinforced concrete section, and said C-clamp is welded to the reinforcement.

6. A reef assembly as set forth in claim 1 including sleeves projecting from the bottom tier to support the assembly on piles.

7. A reef assembly as set forth in claim 1 including a bottom frame for said reef members, and holes in said bottom frame adapted to be fitted over piles driven into the bottom.

8. A reef assembly as set forth in claim 1 wherein each reef member has an axis and a substantially common radius, and said reef members are laterally spaced by about said radius.

9. A reef assembly as set forth in claim 8 wherein said reef members in opposite tiers are laterally offset axis-to-axis by about 1.5 times said radius.

10. A reef assembly as set forth in claim 9 wherein the reef members in the upper tier overlap the edges of the reef members in the lower tier by about one half said radius.

11. A method of fabricating an offshore reef assembly comprising the steps of forming at least two tiers of semi-cylindrical reef members with the top tier opening downwardly and the bottom tier opening upwardly to form a lateral sine curve dissipating path for vertically moving water.

12. A method as set forth in claim 11 wherein the reef members of the upper and lower tier are laterally spaced from each other, and offset laterally from those of the opposite tier to form the sine curve path.

13. A method as set forth in claim 12 wherein each reef member has an axis and a substantially common radius, and said reef members are laterally spaced by about said radius.

14. A method as set forth in claim 13 wherein said reef members in opposite tiers are offset axis-to-axis by about 1.5 times said radius.

15. A method as set forth in claim 13 wherein the reef members in the upper tier overlap the edges of the reef members in the lower tier by about one half said radius.

16. A method as set forth in claim 11 including integrating the two tiers with a center frame to form the assembly.

17. A method as set forth in claim 11 including providing the two tiers with a bottom frame having holes fitting over piles driven into the bottom.

* * * * *